United States Patent [19]

David et al.

[11] Patent Number: 5,095,638
[45] Date of Patent: Mar. 17, 1992

[54] METHOD FOR ASSIGNING STANDARD FASTENERS IN ACCORDANCE WITH A SERIES OF MEASUREMENTS

[75] Inventors: Donald W. David, Stockton; Stephen A. Montero, Temple City, both of Calif.

[73] Assignee: Northrop Corporation, Hawthorne, Calif.

[21] Appl. No.: 593,169

[22] Filed: Oct. 5, 1990

[51] Int. Cl.⁵ .......................... G01B 7/06; G01B 7/02
[52] U.S. Cl. ...................................... 33/783; 33/806; 33/504; 33/554; 33/784; 364/563
[58] Field of Search ................... 33/784, 783, 501.02, 33/501.03, 504, 553, 554, 806; 364/563; 340/678

[56] References Cited

U.S. PATENT DOCUMENTS

| | | | |
|---|---|---|---|
| 2,293,411 | 8/1942 | Spillman. | |
| 4,112,355 | 9/1978 | Gibson, Jr. et al. | 33/504 |
| 4,237,612 | 12/1980 | Christian et al. | 33/143 |
| 4,612,656 | 9/1986 | Suzuki et al. | 377/24 |
| 4,730,247 | 3/1988 | Takahara | 364/560 |
| 4,736,313 | 4/1988 | Nishimura et al. | 364/563 |
| 4,876,800 | 10/1989 | Pekar et al. | 33/784 |
| 4,892,449 | 1/1990 | Croxton | 33/806 |
| 4,930,096 | 5/1990 | Shimizu et al. | 33/784 |

FOREIGN PATENT DOCUMENTS

| | | | |
|---|---|---|---|
| 0055220 | 3/1985 | Japan | 33/784 |
| 2172707 | 9/1986 | United Kingdom | 33/783 |

Primary Examiner—William A. Cuchlinski, Jr.
Assistant Examiner—Alvin Wirthlin
Attorney, Agent, or Firm—Terry J. Anderson; Robert B. Block; Karl J. Hoch, Jr.

[57] ABSTRACT

A portable measuring system for making a series of thickness measurements of a material such as an aircraft skin and for determining therefrom the sizes and quantities of standard size fasteners required for fastening the material. For each measurement, a fixed probe is inserted through a hole in the material so as to engage an inner surface of the material, and a slidable probe engages an outer surface of the material to measure the material's thickness. Each measurement is compared to a table stored in associated data processing equipment to relate the measured thickness to the applicable standard fastener size. The sizes and numbers of standard fasteners required are accumulated over the series of measurements and displayed to the user.

2 Claims, 2 Drawing Sheets

METHOD FOR ASSIGNING STANDARD FASTENERS IN ACCORDANCE WITH A SERIES OF MEASUREMENTS

FIELD OF THE INVENTION

This invention relates to a system and method for making a plurality of thickness measurements of a material, and more particularly to a system and method for determining which, where and the number of standard fasteners to be used in accordance with such measurements.

BACKGROUND OF THE INVENTION

Instruments for measuring the thicknesses of aerospace skins and related supporting structures exist in the prior art. In most instances, those instruments enable a user to measure the thickness of an aircraft skin and its supporting structure while having access to only one side of the skin. In U.S. Pat. No. 2,293,411 to Spillmann, a thickness gauge is described which includes a hook shaped portion that is extendable through an opening in the skin of a closed structure and is adapted to engage the hidden side of the skin. A secondary probe is movable to bear upon the outer surface of the skin, to thereby enable a measurement to be taken indicating the thickness of the skin.

In U.S. Pat. No. 4,237,612 to Christian et al., a similar measuring instrument is described which measures a skin thickness and determines a corresponding fastener grip length. Christian et al. describes a measuring structure similar to that shown by Spillmann, but rather employs an electronic system rather than the mechanical device shown by Spillmann. Christian et al. employ a hook shaped probe, around which is mounted a slidable, outer-skin probe. When the hooked probe is inserted in an opening and is hooked onto the hidden (inner) surface of the skin, the slidable outer probe bears upon the outer surface of the skin. Attached to the slidable probe is a wiper which passes over a commutator-like structure within the instrument. As the wiper makes contact with each commutator bar, an indication is provided of the size fastener required for the particular measurement. Thus, the user must, after each measurement, either make note of the required fastener or have a supply of all size fasteners available for immediate use.

An electronic measuring apparatus is disclosed in U.S. Pat. No. 4,612,656 to Suzuki et al., and shows a caliper-like structure having a digital read out which is fed to a printer where each measurement may be individually recorded. While the printout of a series of measurements is useful, neither Suzuki, Spillmann, or Christian et al. solve certain problems which are extant in a manufacturing facility. It is often impractical to maintain a supply of a wide variety of fastener lengths at every workstation. Furthermore, it is difficult to anticipate the numbers of each size fastener which will be required at a particular work station as production proceeds. Finally, having to pause after each measurement, find the proper fastener and then insert it, is a time consuming process which is labor-inefficient.

Accordingly, it is an object of this invention to provide a portable measuring system which automatically converts skin measurements to standard fastener sizes.

It is still another object of this invention to provide a portable measuring system which enables more efficient utilization of assembly labor than heretofore.

It is yet another object of this invention to provide a portable measuring system that enables a precise prediction of the number and types of standard fastener sizes required for a series of measurements, and further associates each measurement with a particular standard fastener size.

SUMMARY OF THE INVENTION

A portable measuring system includes a skin thickness gauge having slidable and fixed probes, the fixed probe being insertable in a hole through the skin and engageable with one side thereof. Such engagement causes the slidable probe to engage the other side of the skin and provides a measure of the skin's thickness. The system employs a method for processing those measurements which includes the steps of:

establishing a table with entries which relate skin thickness limits to standard fastener sizes;

comparing each measurement with the table entries to determine a standard fastener size for the measurement;

over a series of measurements, accumulating a number for each size of standard size fastener determined by the comparing step; and indicating to a user the standard size fasteners determined by the comparing step and the number of each standard size fastener arrived at by said accumulating step.

DETAILED DESCRIPTION OF THE INVENTION

Figure 1:
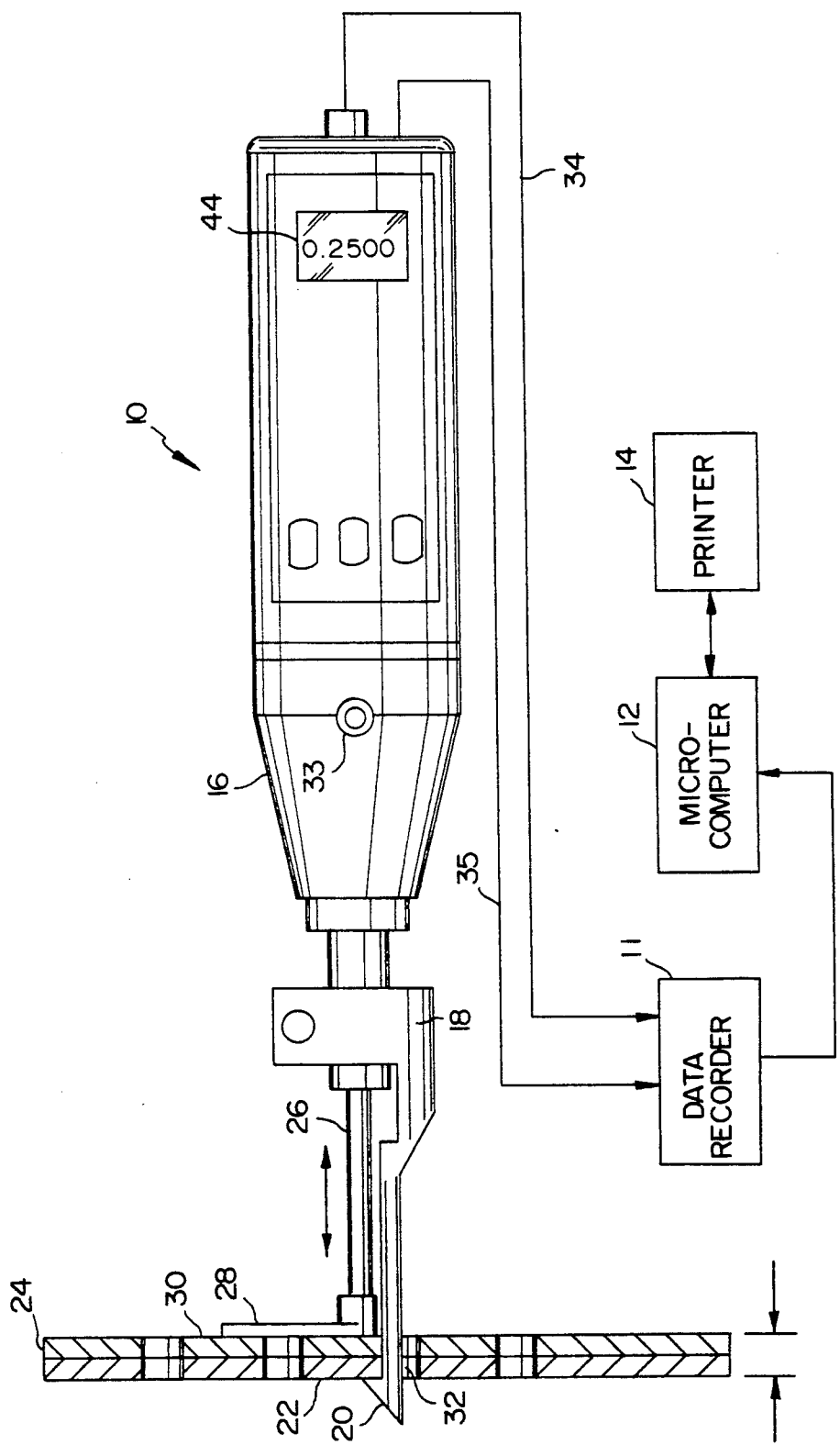
FIG. 1 is a diagram which shows a hand-held skin thickness measuring gauge and the electronics associated therewith.

The invention employs four main components, a measuring instrument 10, a data recorder 11, a microcomputer 12, and a printer 14. Instrument 10 comprises a casing 16, which houses an inner-skin probe portion 18. Probe 18 is fixedly mounted with respect to casing 16 and includes a hook 20 at the distal end thereof for engagement with the inner surface 22 of a skin on structural member 24 and maintains instrument 10 perpendicular to surface 30. A slidably mounted shaft 26 is provided with a flattened extension 2 when it bears against the outer surface 30 of skin 24. Within housing 16, shaft 26 is spring biased outwardly so that when hook portion 20 of probe member 18 is inserted in an opening 32, shaft 26 is biased inwardly into housing 16 by the action of extension 28 bearing against outer surface 30. Within housing 16, electronics are provided which measure the displacement between the surface of extension 28 which bears on outer skin surface 30, with respect to the surface of hook 20, which bears on inner skin surface 22.

An appropriate measurement and indicator circuit suitable for association with the above-described measuring implement is an IDU 25E or SPI digital indicator from the MITUTOYO Corporation, Japan. That indicator provides, via cable 34, a digital indication of the actual measurement value. A microswitch 33, when depressed, places a signal on line 35 which causes Data Recorder 11 to record a reading from instrument 10.

Data recorder 11 stores each reading and may be operated separately from microcomputer 12 so as to enable better portability for the system. When desired, the stored readings in data recorder 11 are downloaded into microcomputer 12 for processing.

Figure 2:
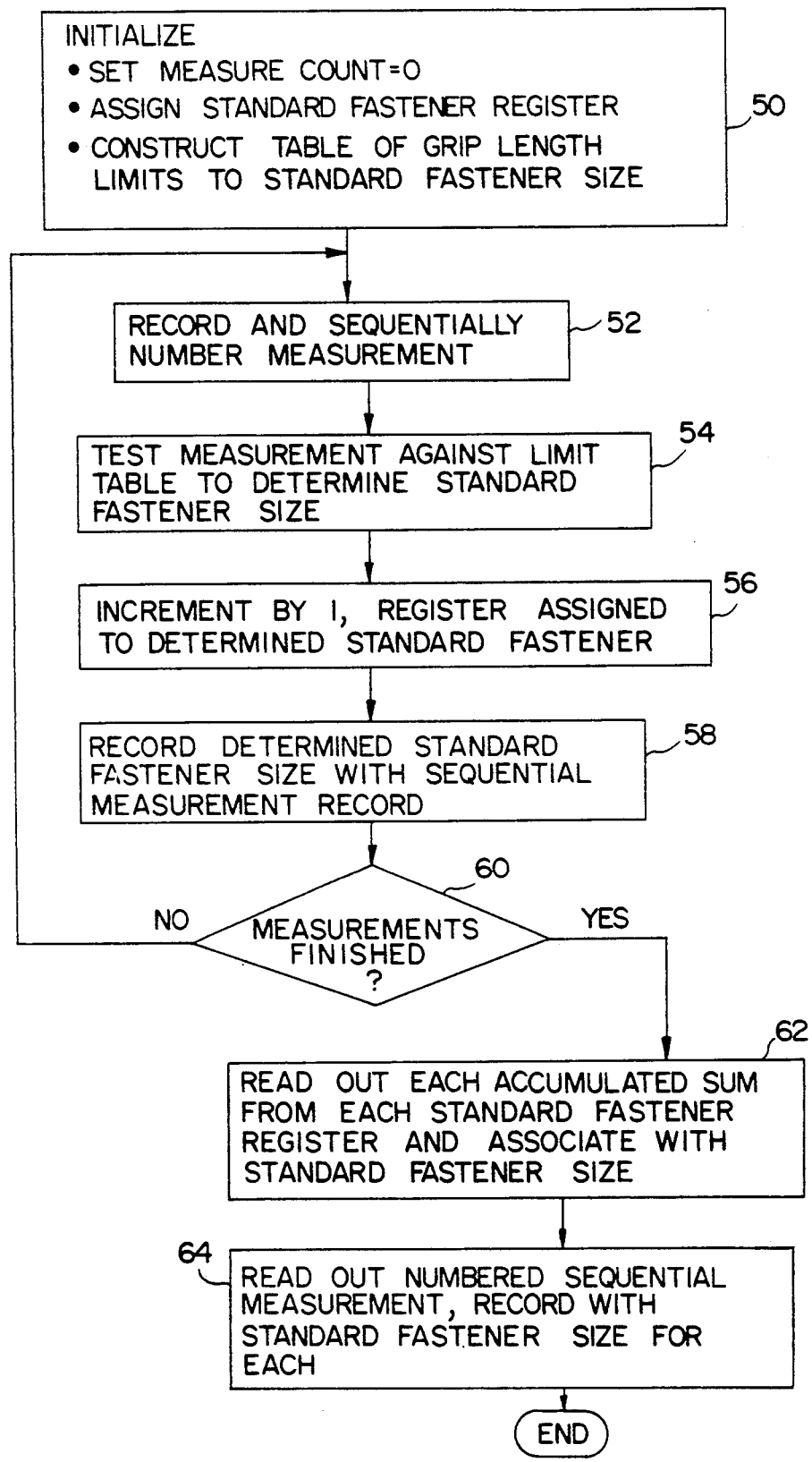
FIG. 2 is a high level flow diagram showing the method of the invention as performed by a microcomputer employed with the invention.

Microcomputer 12 receives the measurement values and processes them in accordance with the flow diagram shown in FIG. 2. Prior to processing the measurements, microcomputer 12 is initialized (box 50) and sets a measurement count equal to zero; assigns a register for each standard fastener size; and constructs a table of grip length limits for each standard fastener size. Table 2, shown below, indicates the measurement limits in thousandths of an inch and equates them to a specific standard size fastener. Such fasteners are available in 1/16th inch increments except for those under 2/16ths of an inch and those over 13/16ths of an inch. The value X is the actual measurement.

TABLE 1

| | | |
|---|---|---|
| IF X >= .0001 AND X <= .0934 THEN | UNDER | 2/16" |
| IF X >= .0935 AND X <= .1564 THEN | | 2/16" |
| IF X >= .1565 AND X <= .2184 THEN | | 3/16" |
| IF X >= .2185 AND X <= .2814 THEN | | 4/16" |
| IF X >= .2815 AND X <= .3434 THEN | | 5/16" |
| IF X >= .3435 AND X <= .4064 THEN | | 6/16" |
| IF X >= .4065 AND X <= .4684 THEN | | 7/16" |
| IF X >= .4685 AND X <= .5314 THEN | | 8/16" |
| IF X >= .5315 AND X <= .5934 THEN | | 9/16" |
| IF X >= .5935 AND X <= .6564 THEN | | 10/16" |
| IF X >= .6565 AND X <= .7184 THEN | | 11/16" |
| IF X >= .7185 AND X <= .7814 THEN | | 12/16" |
| IF X >= .7815 AND X <= .8434 THEN | | 13/16" |
| IF X >= .8435 AND X <= .9999 THEN | OVER | 13/16" |

The user is instructed to take measurements sequentially from an initial measurement point, working in an organized manner about the structure. In use, a user inserts probe 18 into a hole 32 in skin 24, thereby causing shaft 26 to be pushed into housing 16. When the bottom of extension 28 is coincident with surface 30, the user depresses microswitch button 33 to enable the reading displayed on display 44 to be stored in data recorder 11, via cable 34.

As shown in box 52 (FIG. 2), each measurement is sequentially numbered in microcomputer 12. Each measurement is tested against the limits shown in Table 1 to determine the standard fastener size which applies thereto (box 54). The register assigned to the determined standard fastener size is then incremented by one to begin accumulating a sum which will indicate the total requested number for that size fastener (box 56). Additionally, the standard fastener size is recorded in association with the sequential measurement record so that the measurement has associated with it the required standard fastener size (box 58).

The program continues by determining whether all measurements are finished (decision box 60) and if not, recycles back to box 52. If all measurements are finished, microcomputer 12 reads out to printer 14, the accumulated sum from each standard fastener register and, in addition, associates each sum with a standard fastener size. The printout thus includes a total for each size standard fastener along with an identification of the fastener (box 62). Additionally, microcomputer 12 reads out a list of the numbered, sequential measurements along with the standard fastener required for each measurement (box 64). This latter printout enables the user to associate with each measurement, the exact standard fastener required for that measurement. Thus, not only does the user know the precise number of each type of standard fastener required for the job, but also knows the precise fastener to use at each measurement site. Thus, the user is enabled to proceed rapidly, being assured that when all measurements are taken, the proper number of each type of fastener required is indicated as well as an indication where each fastener is to be placed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for determining a standard fastener size and a quantity of fasteners for a manufacturing assembly operation based on a sequential set of physical measurements, comprising:

utilizing a gauge to measure materials to be fastened together to generate a representative size measurement for a first fastener requirement of said manufacturing assembly operation, said gauge having a fixed probe adapted to insertion through a fastener hole of said materials and for engagement with an inner surface of said materials proximate to said fastener hole, said gauge having a slidable probe adapted to engagement with an outer surface of said materials proximate to said fastener hole and opposite from said inner surface, a transducer of said gauge sensing a displacement of said slidable probe relative to said fixed probe to provide said representative size measurement;

transmitting said size measurement to a data recorder;

repeating said steps of measuring and transmitting in a predetermined sequence for each additional fastener requirement for said assembly operation to record in sequence a total number of size measurements for said assembly operation;

associating in a processor a sequence number with each said size measurement;

comparing in said processor each said size measurement to a predetermined range of measurements associated with a standard size of fastener;

selecting in said processor a standard fastener size for each said size measurement based on said comparison;

associating in said processor each said selected standard fastener size with said sequence number associated with said size measurement;

accumulating in said processor a total count of said selections made for each said selected standard fastener size; and, making a record of each selected standard fastener size and the total count accumulated for that selected standard fastener size, and of each sequence number and the selected standard fastener size associated with that sequence number.

2. A method for determining a standard fastener size and a quantity of fasteners for an assembly operation of a workpiece, comprising the steps of:

measuring a thickness of said workpiece at a fastener hole extending through said workpiece, said measurement being made by a thickness gauge having a fixed probe adapted for insertion through said fastener hole and for engagement with an inner surface of said workpiece proximate to said fastener hole, said gauge having a slidable probe adapted for engagement with an outer surface of said workpiece proximate to said fastener hole and opposite from aid inner surface, a transducer of said gauge sensing a displacement of said slidable probe relative to said fixed probe to provide a measurement of said thickness of said workpiece at said fastener hole;

transmitting said measurement to a data recorder;

repeating said steps of measuring and transmitting in sequence according to a predetermined measurement plan for each additional fastener hole of said assembly operation to record sequentially a total number of said measurements for said assembly operation;

transmitting said measurements to a data comparator and associating in said comparator a sequence number with each said measurement;

comparing in sequence in said comparator each said measurement to a predetermined range of measurements associated with a standard size of fastener accommodating said range of measurements;

selecting in sequence in said comparator said standard fastener size for each said measurement based on said comparison and associating in said comparator each said selected standard fastener size with said sequence number associated with each said measurement;

accumulating in said comparator a total count of said selections made for each said selected standard fastener size; and, indicating each selected standard fastener size and the total count accumulated for that selected standard fastener size, and each sequence number and the selected standard fastener size associated with that sequence number.

* * * * *